(12) United States Patent
Zhang et al.

(10) Patent No.: US 10,085,173 B2
(45) Date of Patent: Sep. 25, 2018

(54) METHOD AND NETWORK ENTITY FOR QOS CONTROL

(71) Applicant: Telefonaktiebolaget L M Ericsson (publ), Stockholm (SE)

(72) Inventors: Shunliang Zhang, Beijing (CN); Jian Wang, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 239 days.

(21) Appl. No.: 14/764,098

(22) PCT Filed: Jul. 22, 2015

(86) PCT No.: PCT/CN2015/084779
§ 371 (c)(1),
(2) Date: Jul. 28, 2015

(87) PCT Pub. No.: WO2016/123919
PCT Pub. Date: Aug. 11, 2016

(65) Prior Publication Data
US 2016/0373956 A1    Dec. 22, 2016

(30) Foreign Application Priority Data

Feb. 6, 2015  (CN) ................ PCT/CN2015/072417

(51) Int. Cl.
*H04L 12/26* (2006.01)
*H04W 28/02* (2009.01)
(Continued)

(52) U.S. Cl.
CPC ....... *H04W 28/0268* (2013.01); *H04W 28/16* (2013.01); *H04W 28/24* (2013.01)

(58) Field of Classification Search
CPC ............ H04L 12/1407; H04L 41/0893; H04M 15/66; H04M 15/8038; H04W 4/24;
(Continued)

(56) References Cited

U.S. PATENT DOCUMENTS 7,421,487 B1 * 9/2008 Peterson ................ H04L 12/66
709/220
2008/0082990 A1 * 4/2008 Kong ...................... H04W 4/02
719/318

(Continued)

FOREIGN PATENT DOCUMENTS

| CN | 101242568 A | 8/2008 |
| CN | 102711086 A | 10/2012 |

(Continued)

OTHER PUBLICATIONS

International Preliminary Report on Patentability for Application No. PCT/CN2015/084779, dated May 22, 2017, 26 pages.

(Continued)

*Primary Examiner* — Rebecca E Song
(74) *Attorney, Agent, or Firm* — Nicholson de vos Webster & Elliott LLP

(57) ABSTRACT

The present disclosure provides a method in a network entity for Quality of Service (QoS) control of a service to be provided by a Service Provider (SP) to a user. The method comprises: receiving from another network entity a QoS capability request including a QoS requested by the SP for the service; retrieving a QoS profile of the user from a user database, the QoS profile including a maximum allowable QoS for the user dependent on the user's subscription with a network operator; and controlling a QoS to be authorized to the service based on the requested QoS and the maximum allowable QoS.

31 Claims, 6 Drawing Sheets

(51) Int. Cl.
*H04W 28/24* (2009.01)
*H04W 28/16* (2009.01)

(58) Field of Classification Search
CPC . H04W 28/0268; H04W 28/16; H04W 28/24; H04W 28/10
USPC ............................................... 370/235
See application file for complete search history.

(56) References Cited

U.S. PATENT DOCUMENTS

| | | | | |
|---|---|---|---|---|
| 2011/0219431 | A1* | 9/2011 | Akhtar | H04L 41/5054 726/4 |
| 2011/0320620 | A1* | 12/2011 | Cutler | H04L 41/5029 709/229 |
| 2012/0002540 | A1* | 1/2012 | Siddam | H04W 28/24 370/230 |
| 2012/0108343 | A1 | 5/2012 | Marsico | |
| 2012/0127861 | A1 | 5/2012 | Ahlstrom et al. | |
| 2012/0296784 | A1* | 11/2012 | Connor | H04L 12/1407 705/34 |
| 2013/0267225 | A1* | 10/2013 | Paredes | H04L 12/2417 455/432.1 |
| 2013/0316674 | A1* | 11/2013 | Cho | H04W 4/24 455/406 |
| 2014/0031069 | A1* | 1/2014 | Yang | H04W 68/00 455/458 |
| 2014/0040499 | A1* | 2/2014 | Myers | H04N 21/234327 709/231 |
| 2014/0146746 | A1 | 5/2014 | Forsman et al. | |
| 2014/0160990 | A1* | 6/2014 | Sachdev | H04W 24/02 370/259 |
| 2015/0085664 | A1* | 3/2015 | Sachdev | H04W 28/0215 370/236 |
| 2015/0195374 | A1* | 7/2015 | Wang | H04L 65/601 709/219 |

FOREIGN PATENT DOCUMENTS

| | | |
|---|---|---|
| CN | 103444228 A | 12/2013 |
| RU | 2509433 C2 | 3/2014 |
| TW | 201444385 A | 11/2014 |

OTHER PUBLICATIONS

International Search Report and the Written Opinion for Application No. PCT/CN2015/084779, dated Nov. 9, 2015, 12 pages.
Allowance Decision from foreign counterpart Taiwan Patent Application No. 104138627, dated Oct. 20, 2017, 5 pages.
First Office Action and Search Report for Taiwan Application No. 104138627, dated Jun. 9, 2017, 26 pages.
China Communications Standards Associationv, "notification for the publication of second research topic of China Communications Standards Association in 2013", retrieved <http://www.ccsa.org.cn/worknews/dload_worknews.php?annexid=568>, Sep. 13, 2013, 9 pages.
Office Action and Search Report from foreign counterpart Russian Patent Application No. 2017131207, dated Jul. 31, 2018, 17 pages.

* cited by examiner

METHOD AND NETWORK ENTITY FOR QOS CONTROL

CROSS-REFERENCE TO RELATED APPLICATIONS

This application is a National stage of International Application No. PCT/CN2015/084779, filed Jul. 22, 2015, which claims priority to International Application No. PCT/CN2015/072417, filed Feb. 6, 2015, which are hereby incorporated by reference.

TECHNICAL FIELD

The present disclosure relates to communication technology, and more particularly, to a method and a network entity for Quality of Service (QoS) control of a service to be provided by a Service Provider (SP) to a user.

BACKGROUND

Conventionally, when a user wants to access a service provided over a mobile network operated by a mobile network operator, he/she operates his/her User Equipment (UE) to send a service request, including a requested QoS, to a service control entity of the operator. In response to the service request, the operator may authorize the requested QoS to the service or reject the service request in accordance with the user's subscription with the operator. Alternatively, the UE may not explicitly include the requested QoS in the service request. In this case, the service control entity of the operator may autonomously determine the QoS to be authorized to the service based on a predetermined policy, e.g., the user's subscription with the operator and/or parameters derived from media contents requested by the service request.

With the prevalence of various internet applications and Machine to Machine (M2M) applications, mobile network operators have gradually transitioned into traffic pipe providers exposing their network capabilities to third-party SPs (also known as "Over The Top (OTT)" SPs).

When a user wants to access an OTT service provided by an OTT SP, he/she operates his/her UE to send a service request to the OTT SP. Upon receiving the service request, the SP, having a subscription with the mobile network operator, may request the operator to provide a particular QoS capability for the service on behalf the user.

In this case, it is desired by the mobile network operator to develop a QoS control mechanism for handling such request from the OTT SP.

In addition, the user may also have his/her own subscription with the mobile network operator, which may conflict with the QoS capability requested by the OTT SP. For example, according to the user's subscription with the mobile network operator, the mobile network operator will provide a maximum Guaranteed Bit Rate (GBR) of 1 Mbps to the user, whereas the OTT SP requests a GBR of 2 Mbps for the service to be provided to the user.

There is thus a need for an improved QoS control to handle the QoS capability request from the OTT SP and to solve the above conflict, if any.

SUMMARY

It is an object of the present disclosure to provide a method and a network entity for a flexible QoS control, capable of handling the QoS capability request from an SP and to solve the above conflict, if any.

In a first aspect, a method in a network entity is provided for Quality of Service (QoS) control of a service to be provided by a Service Provider (SP) to a user. The method comprises: receiving from another network entity a QoS capability request including a QoS requested by the SP for the service; retrieving a QoS profile of the user from a user database, the QoS profile including a maximum allowable QoS for the user dependent on the user's subscription with a network operator; and controlling a QoS to be authorized to the service based on the requested QoS and the maximum allowable QoS.

In an embodiment, the QoS capability request further includes a prioritization indication dependent on the SP's subscription with the network operator.

In an embodiment, the QoS capability request further includes a user identifier (ID) of the user and/or an SP ID of the SP. The method further comprises: retrieving, based on the user ID and/or the SP ID, a prioritization indication dependent on the SP's subscription with the network operator from the user database.

In an embodiment, the step of controlling is performed further based on the prioritization indication when the requested QoS is not allowed by the maximum allowable QoS.

In an embodiment, the prioritization indication indicates whether the requested QoS shall be prioritized over the maximum allowable QoS.

In an embodiment, the step of controlling comprises: authorizing the requested QoS to the service when the requested QoS is not allowed by the maximum allowable QoS and the prioritization indication indicates that the requested QoS shall be prioritized over the maximum allowable QoS.

In an embodiment, the step of controlling comprises, when the requested QoS is not allowed by the maximum allowable QoS and the prioritization indication indicates that the requested QoS shall not be prioritized over the maximum allowable QoS: rejecting the QoS capability request, with a cause to notify the SP of a recommended QoS allowable by the maximum allowable QoS, or authorizing the maximum allowable QoS to the service.

In an embodiment, the prioritization indication indicates a first QoS priority level dependent on the SP's subscription with the network operator and the QoS profile further includes a second QoS priority level dependent on the user's subscription with the network operator. The step of controlling is performed further based on a comparison between the first QoS priority level and the second QoS priority level when the requested QoS is not allowed by the maximum allowable QoS.

In an embodiment, the step of controlling comprises: authorizing the requested QoS to the service when the requested QoS is not allowed by the maximum allowable QoS and the comparison indicates that the requested QoS shall be prioritized over the maximum allowable QoS.

In an embodiment, the step of controlling comprises, when the requested QoS is not allowed by the maximum allowable QoS and the comparison indicates that the requested QoS shall not be prioritized over the maximum allowable QoS: rejecting the QoS capability request, with a cause to notify the SP of a recommended QoS allowable by the maximum allowable QoS, or authorizing the maximum allowable QoS to the service.

In an embodiment, the method further comprises: retrieving, based on the SP ID, a QoS profile of the SP from another database, the QoS profile of the SP including a maximum allowable QoS for the SP dependent on the SP's subscription with the network operator; and rejecting the QoS capability request when the requested QoS is not allowed by the maximum allowable QoS for the SP.

In an embodiment, the step of controlling further comprises: authorizing the requested QoS to the service when the requested QoS is allowed by the maximum allowable QoS for the user.

In an embodiment, the network entity is a Policy and Charging Rules Function (PCRF) entity, the other network entity is an Application Access Control (AAC) entity, and the user database is implemented in a Subscription Profile Repository (SPR) entity.

In a second aspect, a network entity is provided for Quality of Service (QoS) control of a service to be provided by a Service Provider (SP) to a user. The network entity comprises: a receiving unit configured to receive from another network entity a QoS capability request including a QoS requested by the SP for the service; a retrieving unit configured to retrieve a QoS profile of the user from a user database, the QoS profile including a maximum allowable QoS for the user dependent on the user's subscription with a network operator; and a controlling unit configured to control a QoS to be authorized to the service based on the requested QoS and the maximum allowable QoS.

In a third aspect, a network entity is provided for QoS control of a service to be provided by an SP to a user. The network entity comprises a transceiver, a processor and a memory. The memory contains instructions executable by the processor whereby the network entity is operative to: receive from another network entity a QoS capability request including a QoS requested by the SP for the service; retrieve a QoS profile of the user from a user database, the QoS profile including a maximum allowable QoS for the user dependent on the user's subscription with a network operator; and control a QoS to be authorized to the service based on the requested QoS and the maximum allowable QoS.

The above embodiments of the first aspect are also applicable for the second and third aspects.

In a fourth aspect, a method in a network entity is provided for facilitating Quality of Service (QoS) control of a service to be provided by a Service Provider (SP) to a user. The method comprises: receiving a QoS capability request from the SP, the request including a QoS requested by the SP for the service; determining whether the SP is an authorized SP based on the SP's subscription with a network operator; and forwarding the QoS capability request to another network entity that controls a QoS to be authorized to the service when the SP is the authorized SP.

In an embodiment, the method further comprises: rejecting the QoS capability request when the SP is not the authorized SP.

In an embodiment, the method further comprises: generating a prioritization indication based on the SP's subscription with the network operator; and including the prioritization indication in the QoS capability request to be forwarded to the other network entity.

In an embodiment, the prioritization indication indicates whether the requested QoS shall be prioritized over a maximum allowable QoS for the user dependent on the user's subscription with the network operator.

In an embodiment, the prioritization indication indicates a first QoS priority level dependent on the SP's subscription with the network operator, so as to enable the other network entity to control the QoS to be authorized to the service based on a comparison between the first QoS priority level and a second QoS priority level dependent on the user's subscription with the network operator.

In an embodiment, the method further comprises: determining whether the requested QoS is allowed by a maximum allowable QoS for the SP dependent on the SP's subscription with the network operator. The QoS capability request is forwarded to the other network entity when the requested QoS is allowed by the maximum allowable QoS for the SP. The QoS capability request is rejected when the requested QoS is not allowed by the maximum allowable QoS for the SP. In an embodiment, the network entity is an Application Access Control (AAC) entity and the other network entity is a Policy and Charging Rules Function (PCRF) entity.

In a fifth aspect, a network entity is provided for facilitating Quality of Service (QoS) control of a service to be provided by a Service Provider (SP) to a user. The network entity comprises: a receiving unit configured to receive a QoS capability request from the SP, the request including a QoS requested by the SP for the service; a determining unit configured to determine whether the SP is an authorized SP based on the SP's subscription with a network operator; and a forwarding unit configured to forward the QoS capability request to another network entity that controls a QoS to be authorized to the service when the SP is the authorized SP.

In a sixth aspect, a network entity is provided for facilitating QoS control of a service to be provided by an SP to a user. The network entity comprises a transceiver, a processor and a memory. The memory contains instructions executable by the processor whereby the network entity is operative to: receive a QoS capability request from the SP, the request including a QoS requested by the SP for the service; determine whether the SP is an authorized SP based on the SP's subscription with a network operator; and forward the QoS capability request to another network entity that controls a QoS to be authorized to the service when the SP is the authorized SP.

The above embodiments of the fourth aspect are also applicable for the fifth and sixth aspects.

With the embodiment of the present disclosure, when a QoS capability request including a QoS requested by an SP for a service on behalf of a user is received, a QoS can be authorized to the service based on the requested QoS and the maximum allowable QoS dependent on the user's subscription with a network operator. Further, when the requested QoS conflicts with the maximum allowable QoS, it is possible to solve the conflict based on a prioritization indication dependent on the SP's subscription with the network operator.

BRIEF DESCRIPTION OF THE DRAWINGS

The above and other objects, features and advantages will be more apparent from the following description of embodiments with reference to the figures, in which.

DETAILED DESCRIPTION

The embodiments of the disclosure will be detailed below with reference to the drawings. It should be noted that the following embodiments are illustrative only, rather than limiting the scope of the disclosure.

Figure 1:
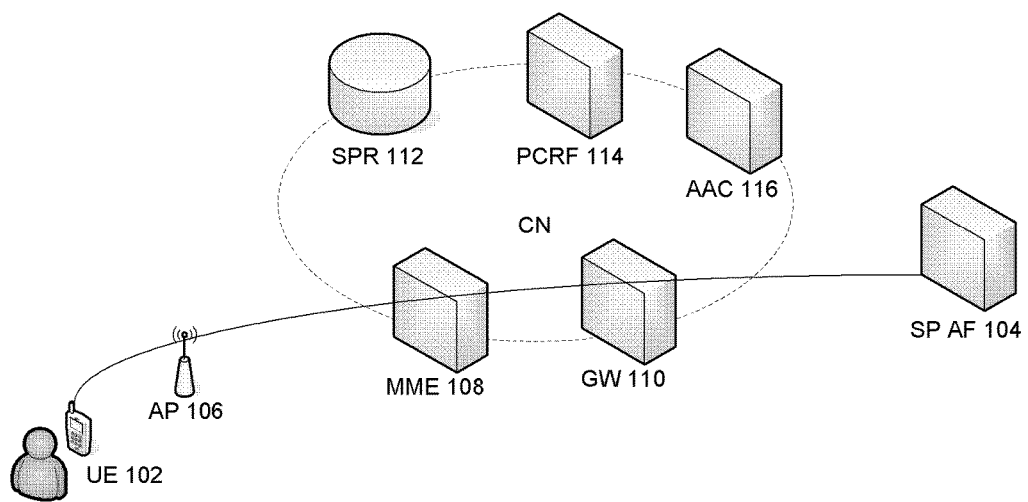
FIG. 1 is a schematic diagram showing an overview of an exemplary network environment where the present disclosure can be applied.

FIG. 1 shows an overview of an exemplary network environment where the present disclosure can be applied. When a user operates his/her UE 102 in order to access a service provided by an SP, the UE 102 sends a service request to an Application Function (AF) entity 104 of the SP, via an Access Network (AN) (including an Access Point (AP) 106) and a Core Network (CN) (including a Mobility Management Entity (MME) 108 and a gateway (GW) 110) of a network operator. Upon receiving the service request, the SP requests the network operator to provide a particular QoS capability for the service on behalf the user. As shown in FIG. 1, an Application Access Control (AAC) entity 116 is introduced at the edge of the CN, serving as an interface between the SP and the CN. The CN further includes a Policy and Charging Rules Function (PCRF) entity 114 for QoS control and a Subscription Profile Repository (SPR) entity 112 for storing the user's subscription with the network operator. The operations of these network entities will be described below in detail.

Figure 2:
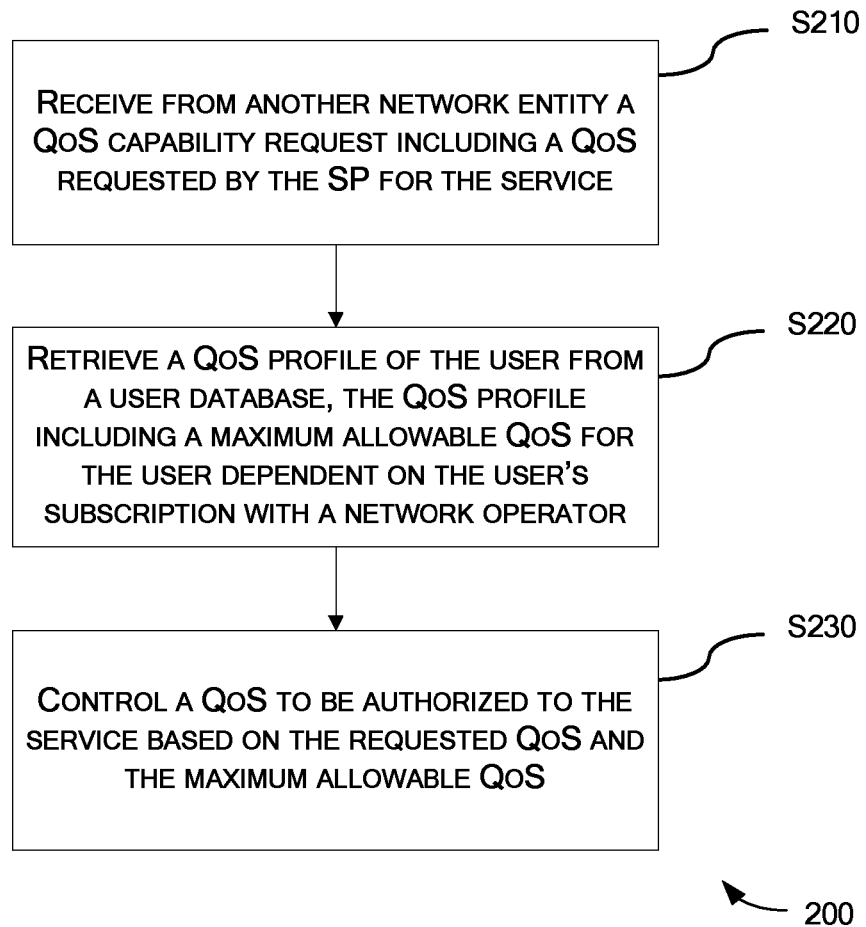
FIG. 2 is a flowchart illustrating a method for QoS control according to an embodiment of the present disclosure.

FIG. 2 is a flowchart illustrating a method 200 for QoS control of a service to be provided by an SP to a user according to an embodiment of the present disclosure. The method 200 can be applied in a network entity for QoS control, e.g., the PCRF entity 114 in FIG. 1, and includes the following steps.

At step S210, a QoS capability request is received from another network entity (e.g., the AAC entity 116 in FIG. 1). The QoS capability request includes a QoS requested by the SP for the service. As used herein, the term "QoS" may include, but not limited to, any one or more of: GBR, packet delay, packet loss rate and packet delay jitter. In the following, the GBR will be assumed as an example of "QoS", without loss of generality.

At step S220, a QoS profile of the user is retrieved from a user database (e.g., the SPR entity 112 in FIG. 1). The QoS profile includes a maximum allowable QoS for the user dependent on the user's subscription with a network operator.

At step S230, a QoS to be authorized to the service is controlled based on the requested QoS and the maximum allowable QoS.

In the following, the above method 200 will be described in detail with reference to two specific implementations.

In a first implementation, the AAC entity 116 may perform a preliminary QoS control to facilitate the QoS control at the PCRF entity 114 (the operations at the AAC entity 116 will be described later with reference to FIG. 3).

In this implementation, the QoS capability request can further include a prioritization indication dependent on the SP's subscription with the network operator. In the step S230, when the requested QoS is not allowed by the maximum allowable QoS (e.g., when the requested GBR is 2 Mbps while the maximum allowable QoS is 1 Mbps), the QoS to be authorized to the service can be controlled further based on the prioritization indication.

In an example, the prioritization indication indicates whether the requested QoS shall be prioritized over the maximum allowable QoS. In this case, in the step S230, when the requested QoS is not allowed by the maximum allowable QoS and the prioritization indication indicates that the requested QoS shall be prioritized over the maximum allowable QoS, the requested QoS can be authorized to the service. For example, when the requested GBR is 2 Mbps and the maximum allowable QoS is 1 Mbps, but the prioritization indication indicates that the requested QoS shall be prioritized over the maximum allowable QoS, a GBR of 2 Mbps can be authorized to the service.

On the other hand, in the step S230, when the requested QoS is not allowed by the maximum allowable QoS and the prioritization indication indicates that the requested QoS shall not be prioritized over the maximum allowable QoS, the QoS capability request can be rejected. In an example, a cause can be included in a QoS capability rejection message to notify the SP of a recommended QoS allowable by the maximum allowable QoS, such that the SP can send another QoS capability request to request an allowable QoS. Here the recommended QoS can be the maximum allowable QoS itself. Alternatively, when the requested QoS is not allowed by the maximum allowable QoS and the prioritization indication indicates that the requested QoS shall not be prioritized over the maximum allowable QoS, the maximum allowable QoS can be authorized to the service. For example, when the requested GBR is 2 Mbps and the maximum allowable QoS is 1 Mbps, and the prioritization indication indicates that the requested QoS shall not be prioritized over the maximum allowable QoS, the QoS capability request can be rejected, with a cause to notify the SP of a recommended QoS of 1 Mbps, or alternatively, a GBR of 1 Mbps (or another GBR allowable by the maximum allowable QoS, e.g., 0.8 Mbps) can be authorized to the service.

In another example, the prioritization indication indicates a first QoS priority level dependent on the SP's subscription with the network operator and the QoS profile further includes a second QoS priority level dependent on the user's subscription with the network operator. For example, the first QoS priority level may be high enough to override any priority level dependent on the user's subscription with the network operator, when the SP has a contract with the network operator that it agrees to pay for all of its users to obtain the requested QoS for the service, regardless of their subscriptions with the network operator. In another example, the SP may divide its users into several categories such as "Gold", "Silver" and "Bronze" and the SP may have a contract with the network operator that it agrees to pay for its "Gold" users to obtain the requested QoS for the service, regardless of their subscriptions with the network operator. In this case, the first QoS priority level may be high enough to override any priority level dependent on the user's subscription with the network operator when the user is one of the "Gold" users. Accordingly, the first QoS priority level for a "Silver" user can be lower than that for a "Gold" user and higher than that for a "Bronze" user. For example, the second QoS priority level can be relatively high when the network operator tends to provide a QoS capability to the user based on the user's subscription with the network operator, or relatively low when the network operator tends to provide a QoS capability to the user based on the SP's subscription with the network operator. In this case, in the step S230, when the requested QoS is not allowed by the maximum allowable QoS, the QoS to be authorized to the service is controlled further based on a comparison between the first QoS priority level and the second QoS priority level. In particular, when the requested QoS is not allowed by the maximum allowable QoS and the comparison indicates that the requested QoS shall be prioritized over the maximum allowable QoS, the requested QoS can be authorized to the service. For example, when the requested GBR is 2 Mbps and the maximum allowable QoS is 1 Mbps, but the comparison indicates that the requested QoS shall be prioritized over the maximum allowable QoS (e.g., when the first QoS priority level is 3 and the second QoS priority level is 1, assuming here that a larger value of QoS priority level means higher priority), a GBR of 2 Mbps can be authorized to the service.

On the other hand, in the step S230, when the requested QoS is not allowed by the maximum allowable QoS and the comparison indicates that the requested QoS shall not be prioritized over the maximum allowable QoS, the QoS capability request can be rejected. In an example, a cause can be included in a QoS capability rejection message to notify the SP of a recommended QoS allowable by the maximum allowable QoS, such that the SP can send another QoS capability request to request an allowable QoS. Here the recommended QoS can be the maximum allowable QoS itself. Alternatively, when the requested QoS is not allowed by the maximum allowable QoS and the comparison indicates that the requested QoS shall not be prioritized over the maximum allowable QoS, the maximum allowable QoS can be authorized to the service. For example, when the requested GBR is 2 Mbps and the maximum allowable QoS is 1 Mbps, and the comparison indicates that the requested QoS shall not be prioritized over the maximum allowable QoS (e.g., when the first QoS priority level is 2 and the second QoS priority level is 3, assuming here that a larger value of QoS priority level means higher priority), the QoS capability request can be rejected, with a cause to notify the SP of a recommended QoS of 1 Mbps (or 0.8 Mbps for example), or alternatively, a GBR of 1 Mbps (or another GBR allowable by the maximum allowable QoS, e.g., 0.8 Mbps) can be authorized to the service.

In a second implementation, the AAC entity 116 does not transmit a prioritization indication to the PCRF entity 114 in the QoS capability request. Instead, the QoS capability request can further include a user ID of the user and/or an SP ID of the SP. Upon receiving the QoS capability request, the PCRF entity 114 can retrieve, based on the user ID and/or the SP ID, a prioritization indication dependent on the SP's subscription with the network operator from the user database. In this implementation, the user database maintains, for each user, a prioritization indication associated with each of one or more SPs. For a particular user, the prioritization indication associated with a particular SP may depend on a service contract between the user and the SP (e.g., whether the user is a "Gold", "Silver" or "Bronze" user) and the SP's subscription with the network operator (e.g., whether the SP agrees to pay for all of its users, or "Gold" users only, to obtain the requested QoS). Similarly to the above first implementation, in the step S230, when the requested QoS is not allowed by the maximum allowable QoS, the QoS to be authorized to the service can be controlled further based on the prioritization indication. The details of the step S230 as described above in connection with the first implementation also apply to this implementation and the description thereof will be omitted here.

In this implementation, the method 200 may further include a process for preliminary QoS control. In particular, a QoS profile of the SP can be retrieved from another database (which can also be implemented at the SPR 112 in FIG. 1) based on the user ID and/or the SP ID. The QoS profile of the SP includes a maximum allowable QoS for the SP dependent on the SP's subscription with the network operator. When the requested QoS is not allowed by the maximum allowable QoS for the SP (e.g., when the requested QoS is 2 Mbps while the maximum allowable QoS for the SP is 1.5 Mbps), the QoS capability request can be rejected.

On the other hand, in both implementations, in the step S230, when the requested QoS is allowed by the maximum allowable QoS for the user (e.g., when the requested QoS is 0.5 Mbps while the maximum allowable QoS for the user is 1 Mbps), the requested QoS can be authorized to the service.

Figure 3:
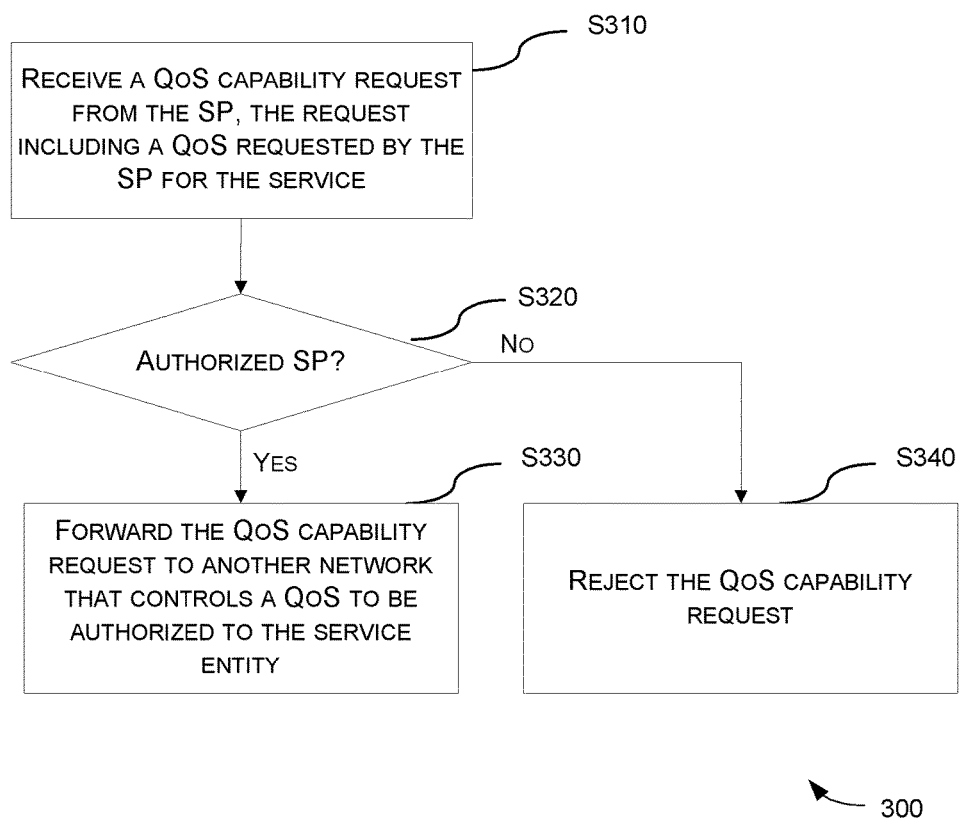
FIG. 3 is a flowchart illustrating a method for facilitating QoS control according to an embodiment of the present disclosure.

FIG. 3 is a flowchart illustrating a method 300 for facilitating QoS control of a service to be provided by an SP to a user according to an embodiment of the present disclosure. The method 300 can be applied in a network entity for facilitating QoS control, e.g., the AAC entity 116 in FIG. 1, and includes the following steps.

At step S310, a QoS capability request is received from the SP (e.g., from the AF entity 104 of the SP). The request includes a QoS requested by the SP for the service.

At step S320, it is determined whether the SP is an authorized SP based on the SP's subscription with a network operator.

For example, the SP's subscription with the network operator can be maintained at, or otherwise retrieved by, the AAC entity 116.

At step S330, when the SP is the authorized SP, the QoS capability request is forwarded to another network entity that controls a QoS to be authorized to the service.

Here, the other network entity can be e.g., the PCRF entity 114 in FIG. 1.

Otherwise, at step S340, when the SP is not the authorized SP, the QoS capability request can be rejected. For example, a rejection message can be sent to the SP. It is to be noted that such explicit rejection is optional and other measures can be taken to deal with the unauthorized SP.

In an example, the method 300 can further include a step of generating a prioritization indication based on the SP's subscription with the network operator. The prioritization indication can be included in the QoS capability request to be forwarded to the other network entity (e.g., the PCRF entity 114).

In an example, the prioritization indication indicates whether the requested QoS shall be prioritized over a maximum allowable QoS for the user dependent on the user's subscription with the network operator.

Alternatively, the prioritization indication indicates a first QoS priority level dependent on the SP's subscription with the network operator, so as to enable the other network entity to control the QoS to be authorized to the service based on a comparison between the first QoS priority level and a second QoS priority level dependent on the user's subscription with the network operator. For the first and second QoS priority levels, reference can be made to the description of the above method 200 and details thereof will be omitted here.

Here, the prioritization indication can be generated in any of various ways. As an example, the QoS capability request may include a user ID of the user and/or a SP ID of the SP. The AAC entity 116 can generate the prioritization indication based on the SP ID, regardless of the user ID. For example, the AAC entity 116 can generate, for all the users of a particular SP, a prioritization indication indicating that the requested QoS shall be prioritized over the maximum allowable QoS for the user. Alternatively, the AAC entity 116 can first determine, based on the user ID, a user category the user belongs to with respect to the SP. Then, the AAC entity 116 can generate the prioritization indication based on the user category. For example, the AAC entity 116 can generate, for only users who are ranked as "premium users" by a particular SP, a prioritization indication indicating that the requested QoS shall be prioritized over the maximum allowable QoS for the user.

Optionally, the method 300 may further include a process for preliminary QoS control. In particular, it is first determined whether the requested QoS is allowed by a maximum allowable QoS for the SP dependent on the SP's subscription with the network operator. Then, when the requested QoS is not allowed by the maximum allowable QoS for the SP (e.g., when the requested QoS is 2 Mbps while the maximum allowable QoS for the SP is 1.5 Mbps), the QoS capability request can be rejected. On the other hand, when the requested QoS is allowed by the maximum allowable QoS for the SP, the QoS capability request can be forwarded to the PCRF entity 114.

Figure 4:
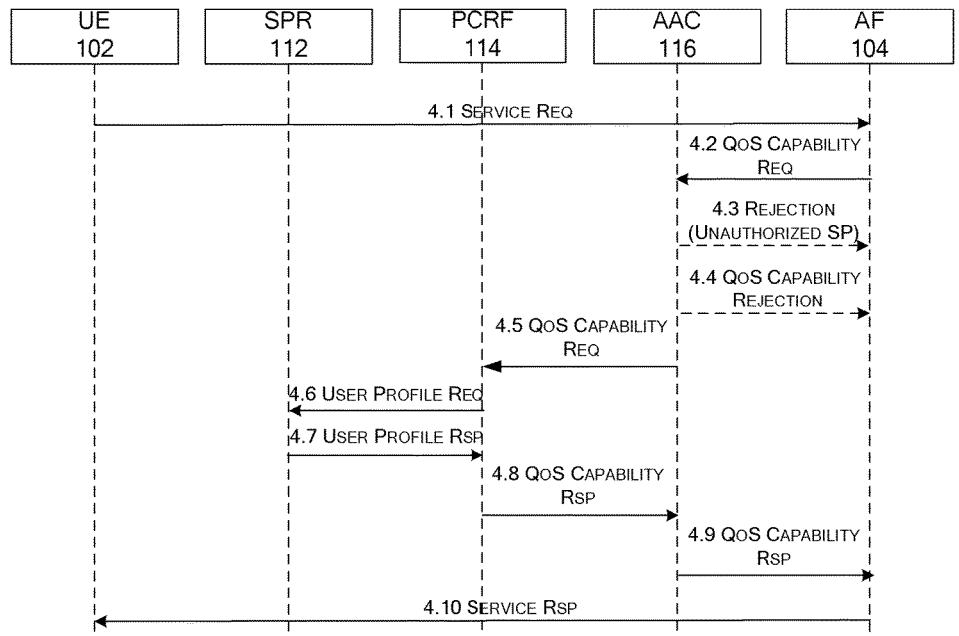
FIG. 4 is a sequence chart explaining a first implementation of the method shown in FIG. 2 and the method shown in FIG. 3.

In the following, the above methods 200 and 300 will be further explained. FIG. 4 is a sequence chart explaining the first implementation of the method 200 and the method 300.

As shown in FIG. 4, at 4.1, the UE 102 sends a service request (e.g., in a Hyper Text Transfer Protocol (HTTP) Request message) to the AF 104 of the SP (via AN and CN nodes not shown in FIG. 4), requesting to access a service provided by the SP. At 4.2, the AF 104 sends a QoS capability request (e.g., in a HTTP Post message) to the AAC 116, including a requested QoS for the service as well as application ID, user ID and SP ID. Then, the AAC 116 determines whether the SP is an authorized SP based on the SP's subscription with a network operator. If not, at 4.3, the AAC 116 sends a rejection message to the AF 104. Optionally, the AAC 116 may perform the preliminary QoS control to determine whether the requested QoS is allowed by the maximum allowable QoS for the SP. If not, at 4.4, the AAC 116 sends a QoS capability rejection to the AF 104. On the other hand, if the SP is the authorized SP and, if the requested QoS is allowed by the maximum allowable QoS for the SP when the preliminary QoS control is applied, the AAC 116 generates a prioritization indication based on the SP's subscription with the network operator, includes the prioritization indication in the QoS capability request and forwards it to the PCRF 114 (e.g., in a Diameter Authentication and Authorization Request (AAR) message) at 4.5. Upon receiving the QoS capability request with the requested QoS and the prioritization indication, the PCRF 114 sends a user profile request to the SPR 112 for retrieving the user's QoS profile at 4.6. At 4.7, the SPR 112 sends a user profile response back to the PCRF 114, including the maximum allowable QoS for the user and possibly the QoS priority level. Then, the PCRF 114 determines the QoS to be authorized to the service and sends a QoS capability response (e.g., in a Diameter Authentication and Authorization Answer (AAA) message) to the AAC 116 accordingly at 4.8 (reference can be made to the step S230 in FIG. 2 for details). Here, the QoS capability response may indicate a rejection (possibly with a cause to notify the SP of a recommended QoS), an authorization of the requested QoS, or an authorization of the maximum allowable QoS (a QoS allowable by the maximum allowable QoS). At 4.9, the AAC 116 forwards the QoS capability response (e.g., in a HTTP Created message) to the AF 104. If the QoS capability response indicates an authorization of QoS, at 4.10, the AF 104 sends a service response (e.g., in a HTTP response message) to the UE 102.

Figure 5:
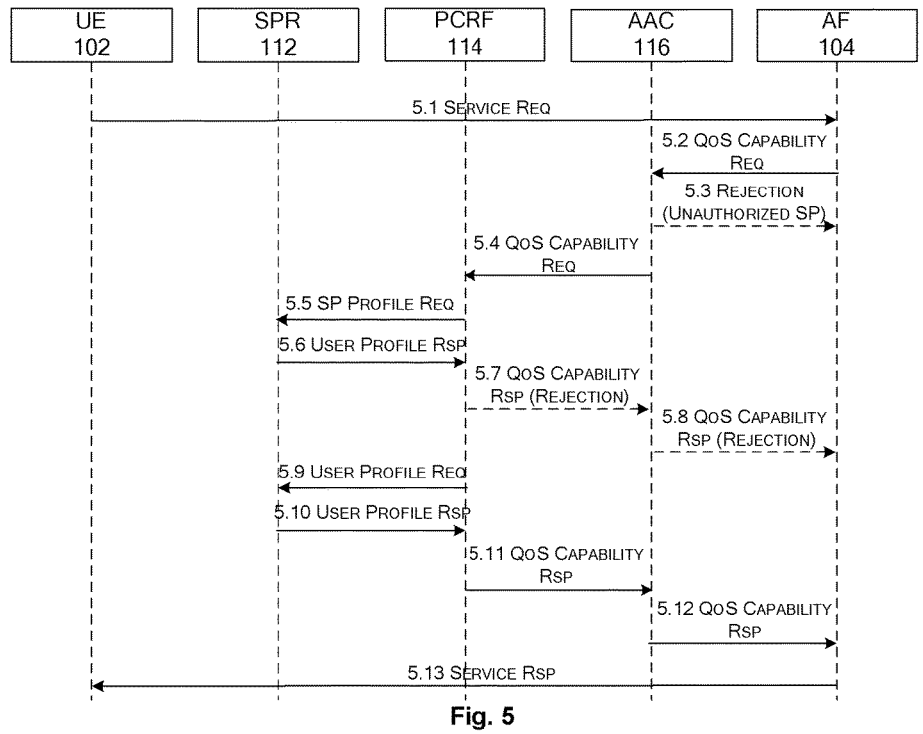
FIG. 5 is a sequence chart explaining a second implementation of the method shown in FIG. 2.

FIG. 5 is a sequence chart explaining the second implementation of the method 200.

As shown in FIG. 5, at 5.1, the UE 102 sends a service request (e.g., in a Hyper Text Transfer Protocol (HTTP) Request message) to the AF 104 of the SP (via AN and CN nodes not shown in FIG. 5), requesting to access a service provided by the SP. At 5.2, the AF 104 sends a QoS capability request (e.g., in a HTTP Post message) to the AAC 116, including a requested QoS for the service as well as application ID, user ID and SP ID. Then, the AAC 116 determines whether the SP is an authorized SP based on the SP's subscription with a network operator. If not, at 5.3, the AAC 116 sends a rejection message to the AF 104. If the SP is an authorized SP, at 5.4, the AAC 116 forwards the QoS capability request to the PCRF 114 (e.g., in a Diameter AAR message). Upon receiving the QoS capability request with the requested QoS, the PCRF 114 performs the preliminary QoS control process. That is, at 5.5, the PCRF 114 sends an SP profile request to the SPR 112 for retrieving the SP's QoS profile. At 5.6, the SPR 112 sends an SP profile response back to the PCRF 114, including the maximum allowable QoS for the SP. Then, the PCRF 114 determines whether the requested QoS is allowed by the maximum allowable QoS for the SP. If not, at 5.7, the AAC 116 sends a QoS capability response (e.g., in a Diameter AAA message) to the AF 104, which in turn forwards it (e.g., in a HTTP Created message) to the AF 104 at 5.8. On the other hand, if the requested QoS is allowed by the maximum allowable QoS for the SP, at 5.9, the PCRF 114 sends a user profile request to the SPR 112 for retrieving the user's QoS profile and the prioritization indication based on the user ID and/or the SP ID. At 5.10, the SPR 112 sends a user profile response back to the PCRF 114, including the maximum allowable QoS for the user, the prioritization indication, and possibly the QoS priority level. Then, the PCRF 114 determines the QoS to be authorized to the service and sends a QoS capability response (e.g., in a Diameter AAA message) to the AAC 116 accordingly at 5.11 (reference can be made to the step S230 in FIG. 2 for details). Here, the QoS capability response may indicate a rejection (possibly with a cause to notify the SP of a recommended QoS), an authorization of the requested QoS, or an authorization of the maximum allowable QoS (a QoS allowable by the maximum allowable QoS). At 5.12, the AAC 116 forwards the QoS capability response (e.g., in a HTTP Created message) to the AF 104. If the QoS capability response indicates an authorization of QoS, at 5.13, the AF 104 sends a service response (e.g., in a HTTP response message) to the UE 102.

Figure 6:
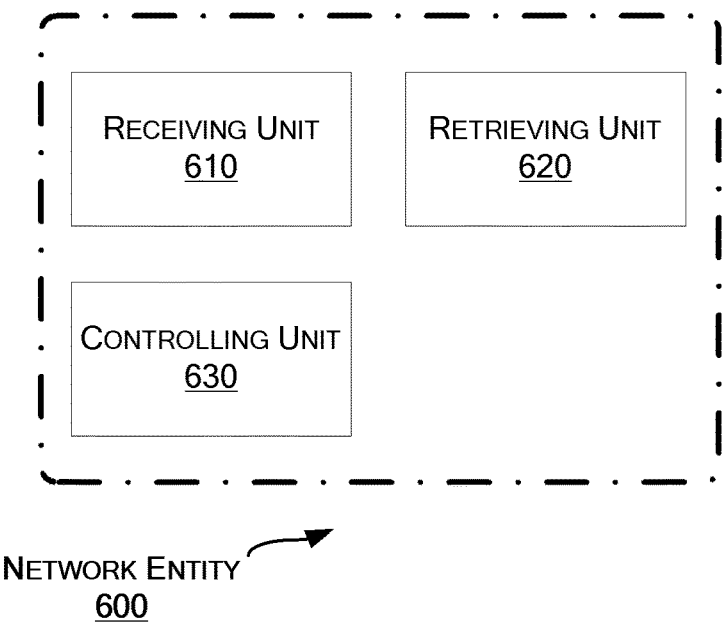
FIG. 6 is a block diagram of a network entity for QoS control according to an embodiment of the present disclosure.

Correspondingly to the method 200 as described above, a network entity is provided. FIG. 6 is a block diagram of a network entity 600 for QoS control of a service to be provided by an SP to a user according to an embodiment of the present disclosure. The network entity 600 can be e.g., the PCRF entity 114 in FIG. 1.

As shown in FIG. 6, the network entity 600 includes a receiving unit 610 configured to receive from another network entity a QoS capability request including a QoS requested by the SP for the service. The network entity 600 further includes a retrieving unit 620 configured to retrieve a QoS profile of the user from a user database, the QoS profile including a maximum allowable QoS for the user dependent on the user's subscription with a network operator. The network entity 600 further includes a controlling unit 630 configured to control a QoS to be authorized to the service based on the requested QoS and the maximum allowable QoS.

In an embodiment, the QoS capability request further includes a prioritization indication dependent on the SP's subscription with the network operator.

In an embodiment, the QoS capability request further includes a user ID of the user and/or an SP ID of the SP. The retrieving unit 620 is further configured to retrieve, based on the user ID and/or the SP ID, a prioritization indication dependent on the SP's subscription with the network operator from the user database.

In an embodiment, the controlling unit 630 is configured to control the QoS to be authorized to the service further based on the prioritization indication when the requested QoS is not allowed by the maximum allowable QoS.

In an embodiment, the prioritization indication indicates whether the requested QoS shall be prioritized over the maximum allowable QoS.

In an embodiment, the controlling unit 630 is configured to authorize the requested QoS to the service when the requested QoS is not allowed by the maximum allowable QoS and the prioritization indication indicates that the requested QoS shall be prioritized over the maximum allowable QoS.

In an embodiment, the controlling unit 630 is configured to, when the requested QoS is not allowed by the maximum allowable QoS and the prioritization indication indicates that the requested QoS shall not be prioritized over the maximum allowable QoS: reject the QoS capability request, with a cause to notify the SP of a recommended QoS allowable by the maximum allowable QoS, or authorize the maximum allowable QoS to the service.

In an embodiment, the prioritization indication indicates a first QoS priority level dependent on the SP's subscription with the network operator, the QoS profile further includes a second QoS priority level dependent on the user's subscription with the network operator, and the controlling unit 630 is configured to control the QoS to be authorized to the service further based on a comparison between the first QoS priority level and the second QoS priority level when the requested QoS is not allowed by the maximum allowable QoS.

In an embodiment, the controlling unit 630 is configured to authorize the requested QoS to the service when the requested QoS is not allowed by the maximum allowable QoS and the comparison indicates that the requested QoS shall be prioritized over the maximum allowable QoS.

In an embodiment, the controlling unit 630 is configured to, when the requested QoS is not allowed by the maximum allowable QoS and the comparison indicates that the requested QoS shall not be prioritized over the maximum allowable QoS: reject the QoS capability request, with a cause to notify the SP of a recommended QoS allowable by the maximum allowable QoS, or authorize the maximum allowable QoS to the service.

In an embodiment, the retrieving unit 620 is further configured to retrieve, based on the SP ID, a QoS profile of the SP from another database. The QoS profile of the SP includes a maximum allowable QoS for the SP dependent on the SP's subscription with the network operator. The controlling unit 630 is further configured to reject the QoS capability request when the requested QoS is not allowed by the maximum allowable QoS for the SP.

In an embodiment, the controlling unit 630 is configured to authorizing the requested QoS to the service when the requested QoS is allowed by the maximum allowable QoS for the user.

In an embodiment, the network entity 600 is a Policy and Charging Rules Function (PCRF) entity, the other network entity is an Application Access Control (AAC) entity, and the user database is implemented in a Subscription Profile Repository (SPR) entity.

Each of the units 610-630 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 2.

Figure 7:
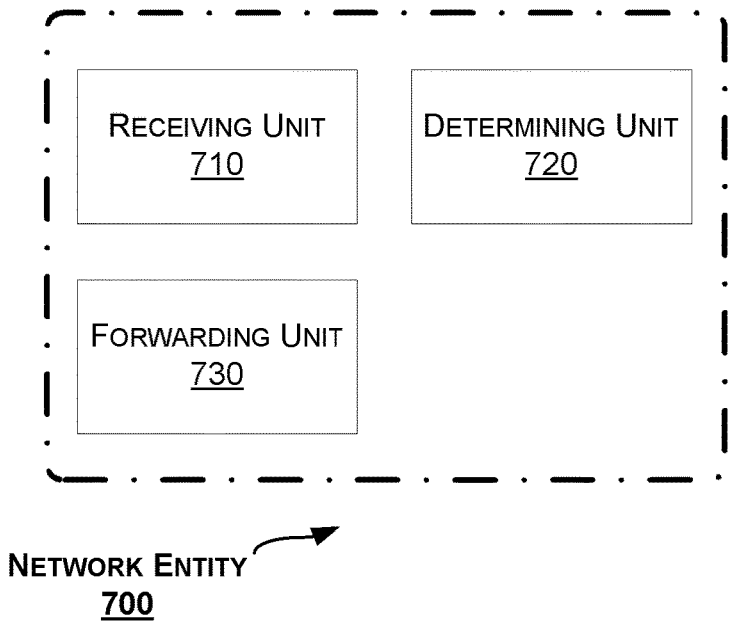
FIG. 7 is a block diagram of a network entity for facilitating QoS control according to an embodiment of the present disclosure.

Correspondingly to the method 300 as described above, a network entity is provided. FIG. 7 is a block diagram of a network entity 700 for facilitating QoS control of a service to be provided by an SP to a user according to an embodiment of the present disclosure. The network entity 700 can be e.g., the AAC entity 116 in FIG. 1.

As shown in FIG. 7, the network entity 700 includes a receiving unit 710 configured to receive a QoS capability request from the SP, the request including a QoS requested by the SP for the service. The network entity 700 further includes a determining unit 720 configured to determine whether the SP is an authorized SP based on the SP's subscription with a network operator. The network entity 700 further includes a forwarding unit 730 configured to forward the QoS capability request to another network entity that controls a QoS to be authorized to the service when the SP is the authorized SP.

In an embodiment, the network entity 700 further includes a rejecting unit (not shown) configured to reject the QoS capability request when the SP is not the authorized SP In an embodiment, the network entity 700 further includes a generating unit (not shown) configured to generate a prioritization indication based on the SP's subscription with the network operator. The forwarding unit 730 is configured to include the prioritization indication in the QoS capability request to be forwarded to the other network entity.

In an embodiment, the prioritization indication indicates whether the requested QoS shall be prioritized over a maximum allowable QoS for the user dependent on the user's subscription with the network operator.

In an embodiment, the prioritization indication indicates a first QoS priority level dependent on the SP's subscription with the network operator, so as to enable the other network entity to control the QoS to be authorized to the service based on a comparison between the first QoS priority level and a second QoS priority level dependent on the user's subscription with the network operator.

In an embodiment, the determining unit 720 is further configured to determine whether the requested QoS is allowed by a maximum allowable QoS for the SP dependent on the SP's subscription with the network operator. The forwarding unit 730 is configured to forward the QoS capability request to the other network entity when the requested QoS is allowed by the maximum allowable QoS for the SP. The rejecting unit is further configured to reject the QoS capability request when the requested QoS is not allowed by the maximum allowable QoS for the SP.

In an embodiment, the network entity is an Application Access Control (AAC) entity and the other network entity is a Policy and Charging Rules Function (PCRF) entity.

Each of the units 710-730 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 3.

Figure 8:
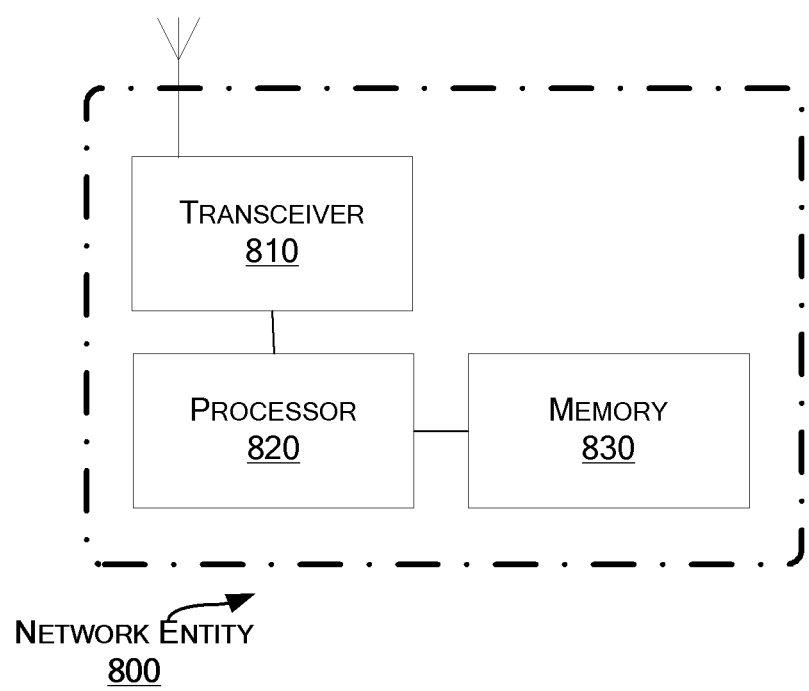
FIG. 8 is a block diagram of a network entity according to another embodiment of the present disclosure.

FIG. 8 is a block diagram of a network entity 800 according to another embodiment of the present disclosure.

The network entity 800 can be provided for QoS control of a service to be provided by an SP to a user. The network entity 800 includes a transceiver 810, a processor 820 and a memory 830. The memory 830 contains instructions executable by the processor 820 whereby the network entity 800 is operative to: receive from another network entity a QoS capability request including a QoS requested by the SP for the service; retrieve a QoS profile of the user from a user database, the QoS profile including a maximum allowable QoS for the user dependent on the user's subscription with a network operator; and control a QoS to be authorized to the service based on the requested QoS and the maximum allowable QoS.

Alternatively, the network entity 800 can be provided for facilitating QoS control of a service to be provided by an SP to a user. Accordingly, the memory 830 contains instructions executable by the processor 820 whereby the network entity 800 is operative to: receive a QoS capability request from the SP, the request including a QoS requested by the SP for the service; determine whether the SP is an authorized SP based on the SP's subscription with a network operator; and forward the QoS capability request to another network entity that controls a QoS to be authorized to the service when the SP is the authorized SP.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 820 causes the network entity 800 to perform the actions, e.g., of the procedure described earlier in conjunction with FIG. 2 or 3.

The computer program product may be configured as a computer program code structured in computer program modules. The computer program modules could essentially perform the actions of the flow illustrated in FIG. 2 or 3.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network entity for Quality of Service (QoS) control of a service to be provided by a Service Provider (SP) to a user, comprising:
    receiving from another network entity a QoS capability request including a QoS requested by the SP for the service, and the QoS capability request further includes a prioritization indication dependent on the SP's subscription with a network operator;
    retrieving a QoS profile of the user from a user database, the QoS profile including a maximum allowable QoS for the user dependent on the user's subscription with the network operator, wherein the SP is a third party apart from the network operator; and
    controlling a QoS to be authorized to the service based on:
        the requested QoS,
        the maximum allowable QoS, and
        whether the prioritization indication indicates that the requested QoS shall be prioritized over the maximum allowable QoS when the requested QoS is not allowed by the maximum allowable QoS.

2. The method of claim 1, wherein the QoS capability request further includes a user identifier (ID) of the user and/or an SP ID of the SP, and the method further comprises:
    retrieving, based on the user ID and/or the SP ID, a prioritization indication dependent on the SP's subscription with the network operator from the user database.

3. The method of claim 2, further comprising:
    retrieving, based on the SP ID, a QoS profile of the SP from another database, the QoS profile of the SP including a maximum allowable QoS for the SP dependent on the SP's subscription with the network operator; and
    rejecting the QoS capability request when the requested QoS is not allowed by the maximum allowable QoS for the SP.

4. The method of claim 1, wherein said controlling comprises:
    authorizing the requested QoS to the service when the requested QoS is not allowed by the maximum allowable QoS and the prioritization indication indicates that the requested QoS shall be prioritized over the maximum allowable QoS.

5. The method of claim 1, wherein said controlling comprises, when the requested QoS is not allowed by the maximum allowable QoS and the prioritization indication indicates that the requested QoS shall not be prioritized over the maximum allowable QoS:
    rejecting the QoS capability request, with a cause to notify the SP of a recommended QoS allowable by the maximum allowable QoS, or
    authorizing the maximum allowable QoS to the service.

6. The method of claim 1, wherein the prioritization indication indicates a first QoS priority level dependent on the SP's subscription with the network operator, the QoS profile further includes a second QoS priority level dependent on the user's subscription with the network operator, and said controlling is further based on a comparison between the first QoS priority level and the second QoS priority level when the requested QoS is not allowed by the maximum allowable QoS.

7. The method of claim 6, wherein said controlling comprises:
authorizing the requested QoS to the service when the requested QoS is not allowed by the maximum allowable QoS and the comparison indicates that the requested QoS shall be prioritized over the maximum allowable QoS.

8. The method of claim 6, wherein said controlling comprises, when the requested QoS is not allowed by the maximum allowable QoS and the comparison indicates that the requested QoS shall not be prioritized over the maximum allowable QoS:
rejecting the QoS capability request, with a cause to notify the SP of a recommended QoS allowable by the maximum allowable QoS, or
authorizing the maximum allowable QoS to the service.

9. The method of claim 1, wherein said controlling comprises:
authorizing the requested QoS to the service when the requested QoS is allowed by the maximum allowable QoS for the user.

10. The method of claim 1, wherein the network entity is a Policy and Charging Rules Function (PCRF) entity, the other network entity is an Application Access Control (AAC) entity, and the user database is implemented in a Subscription Profile Repository (SPR) entity.

11. A method in a network entity for facilitating Quality of Service (QoS) control of a service to be provided by a Service Provider (SP) to a user, comprising:
receiving a QoS capability request from the SP, the QoS capability request including a QoS requested by the SP for the service;
determining whether the SP is an authorized SP based on the SP's subscription with a network operator;
generating a prioritization indication based on the SP's subscription with the network operator, wherein the prioritization indication indicates whether the requested QoS shall be prioritized over a maximum allowable QoS for the user dependent on the user's subscription with the network operator; and
forwarding the QoS capability request to another network entity that controls a QoS to be authorized to the service when the SP is authorized based on the SP's subscription with the network operator, wherein the QoS capability request includes the prioritization indication.

12. The method of claim 11, further comprising:
rejecting the QoS capability request when the SP is not the authorized SP.

13. The method of claim 11, wherein the prioritization indication indicates a first QoS priority level dependent on the SP's subscription with the network operator, so as to enable the other network entity to control the QoS to be authorized to the service based on a comparison between the first QoS priority level and a second QoS priority level dependent on the user's subscription with the network operator.

14. The method of claim 11, further comprising:
determining whether the requested QoS is allowed by a maximum allowable QoS for the SP dependent on the SP's subscription with the network operator, and wherein the QoS capability request is forwarded to the other network entity when the requested QoS is allowed by the maximum allowable QoS for the SP, and wherein the QoS capability request is rejected when the requested QoS is not allowed by the maximum allowable QoS for the SP.

15. The method of claim 11, wherein the network entity is an Application Access Control (AAC) entity and the other network entity is a Policy and Charging Rules Function (PCRF) entity.

16. A network entity for Quality of Service (QoS) control of a service to be provided by a Service Provider (SP) to a user, comprising:
a processor and a non-transitory computer readable medium storing instructions that when executed by the processor, cause the network entity to:
receive from another network entity a QoS capability request including a QoS requested by the SP for the service, and the QoS capability request further includes a prioritization indication dependent on the SP's subscription with a network operator;
retrieve a QoS profile of the user from a user database, the QoS profile including a maximum allowable QoS for the user dependent on the user's subscription with the network operator, wherein the SP is a third party apart from the network operator; and
control a QoS to be authorized to the service based on:
the requested QoS,
the maximum allowable QoS, and
whether the prioritization indication indicated that the requested QoS shall be prioritized over the maximum allowable QoS when the requested QoS is not allowed by the maximum allowable QoS.

17. The network entity of claim 16, wherein the QoS capability request further includes a user identifier (ID) of the user and/or an SP ID of the SP, and wherein the network entity is further to:
retrieve, based on the user ID and/or the SP ID, a prioritization indication dependent on the SP's subscription with the network operator from the user database.

18. The network entity of claim 17, wherein the network entity is further to retrieve, based on the SP ID, a QoS profile of the SP from another database, the QoS profile of the SP including a maximum allowable QoS for the SP dependent on the SP's subscription with the network operator; and wherein the network entity
is further to reject the QoS capability request when the requested QoS is not allowed by the maximum allowable QoS for the SP.

19. The network entity of claim 16, wherein the network entity is further to authorize the requested QoS to the service when the requested QoS is not allowed by the maximum allowable QoS and the prioritization indication indicated that the requested QoS shall be prioritized over the maximum allowable QoS.

20. The network entity of claim 16, wherein the network entity is further to, when the requested QoS is not allowed by the maximum allowable QoS and the prioritization indication indicates that the requested QoS shall not be prioritized over the maximum allowable QoS:
reject the QoS capability request, with a cause to notify the SP of a recommended QoS allowable by the maximum allowable QoS, or
authorize the maximum allowable QoS to the service.

21. The network entity of claim 16, wherein the prioritization indication indicates a first QoS priority level dependent on the SP's subscription with the network operator, the QoS profile further includes a second QoS priority level dependent on the user's subscription with the network operator, and wherein the network entity is further to control the QoS to be authorized to the service further based on a comparison between the first QoS priority level and the second QoS priority level when the requested QoS is not allowed by the maximum allowable QoS.

22. The network entity of claim 21, wherein the network entity is further to authorize the requested QoS to the service when the requested QoS is not allowed by the maximum allowable QoS and the comparison indicates that the requested QoS shall be prioritized over the maximum allowable QoS.

23. The network entity of claim 21, wherein the network entity is further to, when the requested QoS is not allowed by the maximum allowable QoS and the comparison indicates that the requested QoS shall not be prioritized over the maximum allowable QoS:

reject the QoS capability request, with a cause to notify the SP of a recommended QoS allowable by the maximum allowable QoS, or authorize the maximum allowable QoS to the service.

24. The network entity of claim 16, wherein the network entity is further to authorizing the requested QoS to the service when the requested QoS is allowed by the maximum allowable QoS for the user.

25. The network entity of claim 16, wherein the network entity is a Policy and Charging Rules Function (PCRF) entity, the other network entity is an Application Access Control (AAC) entity, and the user database is implemented in a Subscription Profile Repository (SPR) entity.

26. A network entity for facilitating Quality of Service (QoS) control of a service to be provided by a Service Provider (SP) to a user, comprising:

a processor and a non-transitory computer readable medium storing instructions that when executed by the processor, cause the network entity to:

receive a QoS capability request from the SP, the QoS capability request including a QoS requested by the SP for the service;

determine whether the SP is an authorized SP based on the SP's subscription with a network operator;

generate a prioritization indication based on the SP's subscription with the network operator, wherein the prioritization indication indicated whether the requested QoS shall be prioritized over a maximum allowable QoS for the user dependent on the user's subscription with the network operator; and forward the QoS capability request to another network entity that controls a QoS to be authorized to the service when the SP is authorized based on the SP's subscription with the network operator, wherein the QoS capability request includes the prioritization indication.

27. The network entity of claim 26, wherein the network entity is further to:

reject the QoS capability request when the SP is not authorized SP.

28. The network entity of claim 26, wherein the prioritization indication indicates a first QoS priority level dependent on the SP's subscription with the network operator, so as to enable the other network entity to control the QoS to be authorized to the service based on a comparison between the first QoS priority level and a second QoS priority level dependent on the user's subscription with the network operator.

29. The network entity of claim 26, wherein the network entity is further to:

determine whether the requested QoS is allowed by a maximum allowable QoS for the SP dependent on the SP's subscription with the network operator, and forward the QoS capability requested to the another network entity when the requested QoS is allowed by the maximum allowable QoS for the SP.

30. The network entity of claim 29, wherein the network entity is further to:

reject the QoS capability request when the requested QoS is not allowed by the maximum allowable QoS for the SP.

31. The network entity of claim 26, wherein the network entity is an Application Access Control (AAC) entity and the another network entity is a Policy and Charging Rules Function (PCRF) entity.

* * * * *

UNITED STATES PATENT AND TRADEMARK OFFICE
CERTIFICATE OF CORRECTION

PATENT NO. : 10,085,173 B2  
APPLICATION NO. : 14/764098  
DATED : September 25, 2018  
INVENTOR(S) : Zhang et al.

Page 1 of 1

It is certified that error appears in the above-identified patent and that said Letters Patent is hereby corrected as shown below:

In the Claims

In Column 15, Line 28, in Claim 10, delete "other" and insert -- another --, therefor.

In Column 15, Line 56, in Claim 13, delete "other" and insert -- another --, therefor.

In Column 15, Line 66, in Claim 14, delete "other" and insert -- another --, therefor.

In Column 16, Line 5, in Claim 15, delete "other" and insert -- another --, therefor.

In Column 16, Line 28, in Claim 16, delete "indicated" and insert -- indicates --, therefor.

In Column 16, Line 52, in Claim 19, delete "indicated" and insert -- indicates --, therefor.

In Column 17, Line 29, in Claim 25, delete "other" and insert -- another --, therefor.

In Column 18, Line 3, in Claim 26, delete "indicated" and insert -- indicates --, therefor.

In Column 18, Lines 15-16, in Claim 27, delete "not authorized" and insert -- not the authorized --, therefor.

In Column 18, Line 20, in Claim 28, delete "other" and insert -- another --, therefor.

In Column 18, Line 30, in Claim 29, delete "requested" and insert -- request --, therefor.

Signed and Sealed this  
Twenty-first Day of May, 2019

Andrei Iancu  
*Director of the United States Patent and Trademark Office*